United States Patent
Snyders

(10) Patent No.: US 7,918,932 B2
(45) Date of Patent: Apr. 5, 2011

(54) PRODUCTION OF INORGANIC DOPED-ZIRCON PIGMENTS

(75) Inventor: Ettienne Snyders, Pretoria (ZA)

(73) Assignee: The South African Nuclear Energy Corporation Limited, Brits (ZA)

( * ) Notice: Subject to any disclaimer, the term of this patent is extended or adjusted under 35 U.S.C. 154(b) by 138 days.

(21) Appl. No.: 11/587,787

(22) PCT Filed: Apr. 26, 2005

(86) PCT No.: PCT/IB2005/051350
§ 371 (c)(1),
(2), (4) Date: Feb. 4, 2008

(87) PCT Pub. No.: WO2005/103165
PCT Pub. Date: Nov. 3, 2005

(65) Prior Publication Data
US 2008/0260623 A1    Oct. 23, 2008

(30) Foreign Application Priority Data
Apr. 26, 2004    (ZA) .................................. 2004/3164

(51) Int. Cl.
*C08K 3/00*    (2006.01)

(52) U.S. Cl. .................. 106/451; 106/450; 423/594.12; 423/326

(58) Field of Classification Search .................. 106/450, 106/451; 423/326, 594.12
See application file for complete search history.

(56) References Cited

U.S. PATENT DOCUMENTS

| 3,510,332 | A |   | 5/1970 | Weber |
| 4,047,970 | A |   | 9/1977 | Morriss et al. |
| 5,228,910 | A | * | 7/1993 | Joyce et al. .................. 106/450 |

FOREIGN PATENT DOCUMENTS

| GB | 1 230 076 | 4/1971 |
| GB | 1 447 276 | 8/1976 |
| WO | WO 96/26159 | 8/1996 |

* cited by examiner

*Primary Examiner* — Stuart Hendrickson
*Assistant Examiner* — Richard M Rump
(74) *Attorney, Agent, or Firm* — Kenyon & Kenyon LLP

(57) ABSTRACT

A process for producing an inorganic doped-zircon pigment includes calcining a base mixture comprising raw plasma-dissociated zircon, a chromophore, and at least one mineralizer, to produce a raw pigment. The raw pigment is refined to obtain an inorganic doped-zircon pigment.

8 Claims, 1 Drawing Sheet

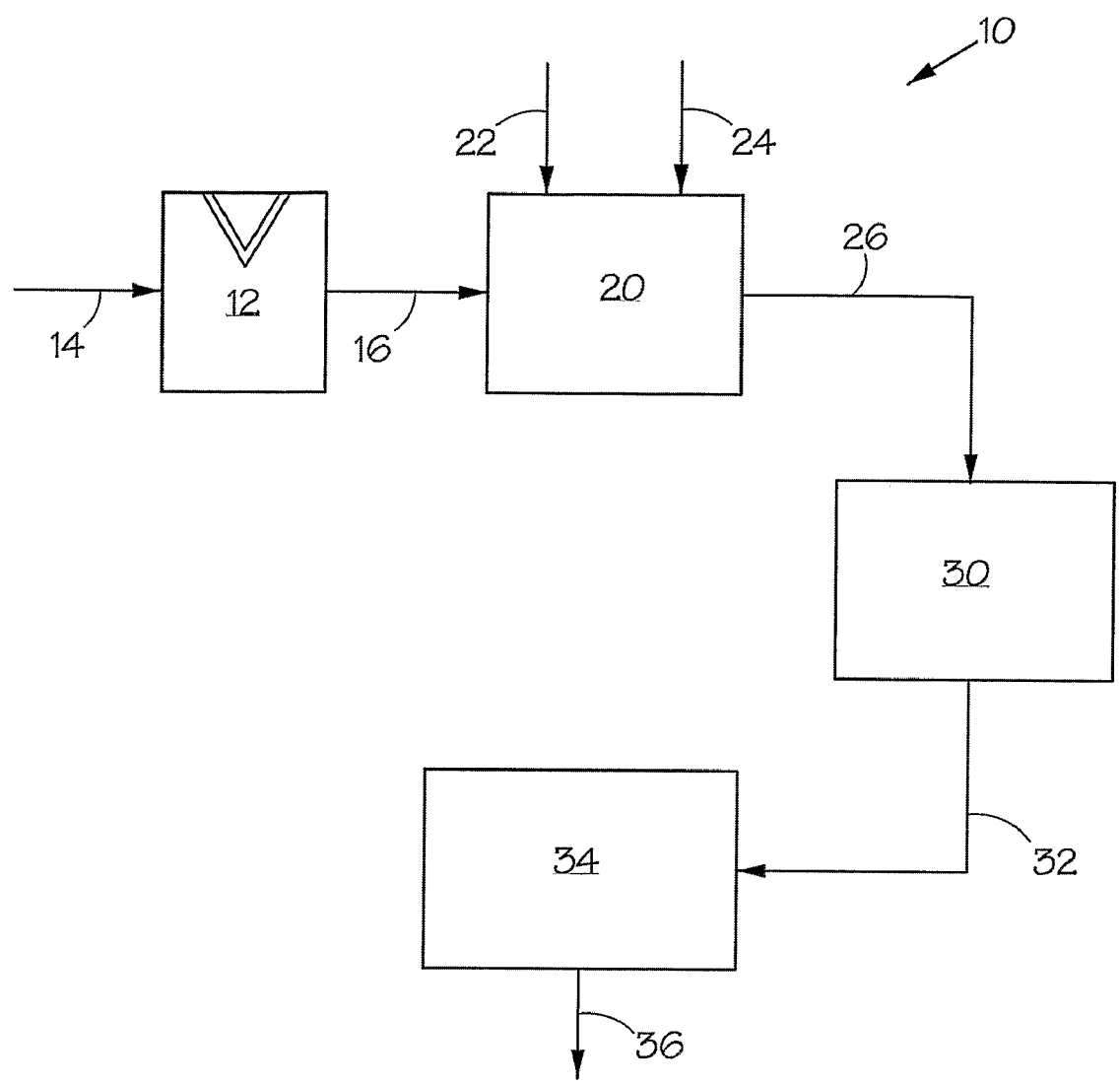

PRODUCTION OF INORGANIC DOPED-ZIRCON PIGMENTS

THIS INVENTION relates to the production of inorganic doped-zircon pigments. It relates in particular to a process for producing an inorganic doped-zircon pigment.

According to the invention, there is provided a process for producing an inorganic doped-zircon pigment, which process includes
calcining a base mixture comprising raw plasma-dissociated zircon, a chromophore, and at least one mineralizer, to produce a raw pigment; and
refining the raw pigment to obtain an inorganic doped-zircon pigment.

By 'raw plasma dissociated zircon or PDZ' is meant PDZ that has been obtained directly by means of plasma dissociation, ie without any treatment thereof between the plasma dissociation of the zircon and the mixing of the resultant PDZ with the chromophore and the mineralizer, being effected. In particular, the process is characterized thereby that the raw PDZ is not subjected to any milling and/or any chemical treatment prior to its use in forming the base mixture.

The raw PDZ may be that obtained by generating a high temperature plasma zone, and feeding particulate zircon, $ZrSiO_4$, into the plasma zone, thereby to dissociate the zircon into the raw PDZ. The generation of the plasma zone may be by means of a non-transfer arc plasma, rather than by means of a transfer arc plasma. More particularly, the high temperature plasma zone may be provided by means of a plasma flame generated by at least one non-transfer arc plasma gun. The zircon may be allowed to free fall through the plasma zone to achieve the dissociation into the raw PDZ, whereafter the raw PDZ may be quenched in a quench zone below the plasma zone. Preferably, three non-transfer arc plasma guns, arranged in a star fashion (when seen in plan view) with their operative ends being downwardly inwardly directed, may be provided, with the zircon then being allowed to free fall centrally through the resultant combined plasma zone.

The process for treating the zircon to produce the raw PDZ may thus be in accordance with WO 96/26159, which is hence incorporated herein by reference thereto.

Furthermore, the treatment of the zircon to produce the raw PDZ may form part of the process of the present invention.

The chromophore or colour-determining agent, when it is desired to obtain a yellow pigment, may be sodium molibdate or may be praseodymium-based, eg praseodymium oxide, carbonate or oxalate; when it is desired to obtain a blue pigment, it may be vanadium-based, eg it may be ammonium metavanadate or vanadium pentoxide; when it is desired to obtain a pink pigment, it may be iron-based, eg it may be iron oxide or iron sulphate.

During the calcination of the base mixture, the chromophore, or a transient compound or an ion derived therefrom, becomes entrapped within and/or around the zircon lattice, thereby forming the pigment having the desired colour.

The mineralizers, whose function it is to reduce the temperature at which the reaction of the chromophore with the zircon lattice, ie the calcination reaction, occurs, or to catalyze the calcination reaction, may be an alkali metal halide, particularly an alkali metal fluoride, any other alkaline mineralizer such as $(NH_4)_2SO_4$ or $Na_2SO_4$, or a combination of two or more of these.

The process may include forming the base mixture by mixing the raw PDZ, the chromophore and the mineralizer. The raw PDZ, chromophore and mineralizer are preferably mixed sufficiently so that the base mixture is a homogeneous blend.

The calcination of the base mixture may be effected in an air furnace. The calcination temperature may be from 800° C. to 1300° C.

The refining of the raw pigment may include washing, comminuting and drying it, to obtain the refined inorganic doped-zircon pigment.

The invention will now be described in more detail with reference to the accompanying diagrammatic drawing which depicts a simplified flow diagram of a process according to the invention for producing an inorganic doped-zircon pigment, and with reference to the subsequent non-limiting examples.

In the drawing, reference numeral 10 generally indicates a process according to the invention for producing an inorganic doped-zircon pigment.

The process 10 includes a plasma reactor or plasmatron 12 which is in accordance with WO 96/26159 (which is incorporated herein by reference thereto) and comprises three non-transfer arc plasma guns, arranged in a star pattern (when seen in plan view) with their operative ends being downwardly inwardly directed. In use, the guns generate a central high temperature plasma zone which is at a temperature of at least 1800° C. A zircon feed conduit is arranged so that zircon can be allowed to free fall centrally through the plasma zone, thereby to be dissociated into raw PDZ. A quench zone, in which the raw PDZ is quenched rapidly to below 500° C., is provided below the plasma zone.

A zircon feed line 14 leads into the plasma reactor 12, while a raw PDZ withdrawal line 16 leads from the reactor 12.

The line 16 leads into a mixer 20, with a mineralizer addition line 22, as well as a chromophore addition line 24, leading into the mixer. In the mixer, raw PDZ, mineralizers and a chromophore are mixed into a homogeneously blended base mixture.

A base mixture withdrawal line 26 leads from the mixer 20, into a calcination furnace 30. The calcination furnace 30 is typically an air furnace. In the furnace, the base mixture is calcined at 800° C. to 1300° C., thereby to cause the chromophore to be trapped in or around the crystal lattice of the zircon.

A raw pigment line 32 leads from the calcination furnace 30 to a refining stage 34 where the raw pigment is washed, comminuted and dried.

An inorganic doped-zircon pigment withdrawal line 36 leads from the stage 34.

Raw PDZ produced by dissociating zircon sand in the non-transfer arc plasmatron 12 at an average conversion rate of 90% and with a mean particle size of 108 μm ($d_{50}$, as determined by a Sedigraph 5100 particle size analyzer) was used as starting material in the examples hereunder. In the examples, two samples of this raw PDZ were, in accordance with the invention, used directly as feed material to the calcination furnace 30, without milling and/or chemical treatment, to produce Pr-yellow and V-blue pigments by using vanadium pentoxide ($V_2O_5$) and praseodymium oxide ($Pr_6O_{11}$) respectively as chromophore.

For each of these colours, three control samples of the same 108 μm PDZ were milled down to different particle sizes by means of a wet milling process in a MMS Series RAPID MILL with a 300 cc porcelain milling jar using ytria-stabilized zirconia milling media by applying the following method: For Pr-yellow pigments, the three PDZ control samples were milled down to a $d_{50}$ of 3.5 μm, 6.0 μm and 8.2 μm respectively (see Table 1) as determined by a Sedigraph 5100 particle size analyzer. For V-blue pigments, the three PDZ control samples were milled down to 3.5 µm, 6.0 µm and 8.9 µm respectively (see Table 2).

The PDZ samples were mixed with the required chromophore ($Pr_6O_{11}$ for the yellow pigments and $V_2O_5$ for the blue pigments) and mineralizers as specified in the examples, in a Y-cone tumbler mixer and thereafter calcined at the temperature as specified, to produce pigments. After calcining, the pigments were washed in boiling aqueous hydrochloric acid (HCl) to remove any excess mineralizer and chromophore, ie the chromophore, which was not incorporated into the zircon crystal lattice. The pigments of the unmilled PDZ samples (ie according to the invention) were then comminuted or deagglomerated to a $d_{50}$ of between 8-9 µm for the blue pigment, and between 6-7 µm for the yellow pigment, rendering them suitable for application to ceramic tiles. A pigment/glaze mixture was prepared, applied to a Johnson bisque tile with a spray-gun and fired in a muffle furnace at 1080° C. with a soaking time of 5 minutes, after which colour measurements were done with a Hunterlab colour measuring instrument.

To benchmark the quality of the product in each example, commercially available stains were used as standards, viz ST 4032 for the yellow pigment and ST 3042 for the blue pigment. These were obtained from Ferro Industrial Products (Pty) Ltd in Vulcania, Brakpan, South Africa.

EXAMPLE 1

Praseodymium-Yellow Doped-Zircon Pigment

An amount of 1.0 mole of unmilled, untreated PDZ was mixed with 0.014 moles $Pr_6O_{11}$, 0.2 moles NaF and 0.2 moles $(NH_4)_2SO_4$ in order to ensure a thorough or homogeneous blend of the colour inducing or determining metal oxide, the mineralizers and the PDZ. The mixture was then calcined in an air furnace at a temperature of 1050° C. and for a soaking time of 2 hours after the required temperature of 1050° C. was reached, to allow the reaction of the praseodymium oxide and the mineralizers with the dissociated zircon to take place. The resulting raw yellow pigment was then washed and comminuted to a $d_{50}$ of between 6-7 µm as measured with a Sedigraph 5100 particle size analyzer. For the control samples, similar amounts of the milled, treated PDZ were blended, calcined and post treated as for the unmilled sample, except for the comminution step which was not carried out.

The results of the colour measurements according to the Hunterlab measurement technique for both the invention and the control pigment samples are given in Table 1. From these results, the advantage of using unmilled PDZ according to the present invention as compared to milled and chemically treated PDZ before calcining can be seen clearly.

In Table 1, the b-values (positive indicates yellow on the tile) for the three control samples vary from 37.1 (for the 3.5 µm PDZ sample), to 58.8 (for the 8.2 µm PDZ sample). For the unmilled, untreated PDZ in accordance with the invention, b=75.8. Keeping in mind that the higher the b-value, the deeper the yellow appears on the tile, an increase of 17.0 in b for the pigment using unmilled PDZ as compared to the best control sample pigment obtained from the 8.2 µm PDZ is significant. Furthermore, this value of 75.8 compares very favourable with 79.1 for the standard yellow pigment.

The L-value, which indicates the colour depth of the tile on a scale of 100 for light (white) and 0 for dark (black), of 78.6 for the unmilled PDZ prior to calcination, compares very favourably with 78.7 for the standard, while all the controls are lighter in comparison.

TABLE 1

Example 1
PRODUCTION OF Pr-YELLOW PIGMENT FROM UNMILLED PDZ

| Samples | Average particle size (µm) | L<br>L 100-white<br>L 0-black | a<br>a+: red<br>a−: green | b<br>b+: yellow<br>b−: blue | DE* |
|---|---|---|---|---|---|
| Controls | 3.5 | 82.9 | −2.3 | 37.1 | 42.3 |
| Milled | 6.0 | 81.6 | −1.7 | 56.9 | 22.6 |
| PDZ before calcining | 8.2 | 80.4 | −1.3 | 58.8 | 20.4 |
| Invention Unmilled PDZ | 120 | 78.6 | 1.8 | 75.8 | 3.3 |
| Standard | 4.5 | 78.7 | 1.3 | 79.1 | — |

The deviation parameter DE*, which indicates the deviation of the colour hue and depth from the standard and which is compounded from the primary colour parameters according to the Hunterlab protocol, is a sensitive parameter to determine deviations from the standard and which under typical production line conditions should ideally not exceed 1.0. DE* drops significantly from 20.4 for the best control sample, to 3.3 for the unmilled PDZ sample prior to calcination, which clearly emphasizes the advantage of using the unmilled, untreated PDZ in accordance with the present invention.

EXAMPLE 2

Vanadium-Blue Doped-Zircon Pigment

The same preparation and production conditions were used as in Example 1. However, 1.0 mole of unmilled, untreated PDZ was blended with 0.045 moles $V_2O_5$, 0.2 moles NaF, and 1.0 mole $Na_2SO_4$. The mixture was then calcined in an air furnace at a temperature of 950° C. and for a soaking time of 1 hour after the required temperature of 950° C. was reached, to allow the reaction of the $V_2O_5$ and the mineralizers with the dissociated zircon to take place. In similar fashion to Example 1, the resulting raw blue pigment was washed and comminuted to a $d_{50}$ between 8-9 µm as measured with a Sedigraph 5100 particle size analyzer. For the control samples the same amount of milled, treated PDZ each were blended, calcined and post treated as for the unmilled sample except for the comminution step which was not carried out.

The results of the colour measurements for the V-blue pigments are given in Table 2.

TABLE 2

Example 2
PRODUCTION OF V-BLUE PIGMENT FROM UNMILLED PDZ

| Samples | Average particle size (µm) | L<br>L 100-white<br>L 0-black | a<br>a+: red<br>a−: green | B<br>b+: yellow<br>b−: blue | DE* |
|---|---|---|---|---|---|
| Controls | 3.5 | 67.8 | −17.1 | −6.9 | 22.4 |
| Milled | 6.0 | 67.3 | −16.9 | −3.8 | 23.8 |
| PDZ before calcining | 8.9 | 63.2 | −17.9 | −3.6 | 20.4 |
| Invention Unmilled PDZ | 120 | 53.8 | −19.9 | −13.5 | 6.8 |
| Standard | 8.5 | 48.9 | −21.8 | −17.7 | — |

The substantial advantage of using PDZ in the unmilled and untreated condition prior to the calcining process as compared to the milled and treated PDZ can once again clearly be seen in the results of the Hunterlab colour measurements. The more negative the b-value is, the bluer the colour of the pigment appears after application to the ceramic tile. Amongst the controls b ranges from −6.9 to −3.6 as compared to −13.5 for the pigment made according to the invention, an improvement of −6.6 with respect to the best control (Table 2). The fact that the value of −13.5 is still less than −17.7 for the V-blue standard pigment may be due to the fact that PDZ with a conversion rate of only 90% was used.

In terms of the L-values not only was a spread of 4.6 from 63.2 to 67.8 observed between the different control samples, but also the best (for the 8.9 μm sample) is still 14.3 off the mark with respect to the standard. In contrast, for the unmilled PDZ pigment an improvement of 9.4 compared to the best control was registered while being only 4.9 off the mark against the standard.

Observing the deviation from the standard in terms of DE* all the controls deviate significantly, while the deviation of 6.8 for the unmilled PDZ represents a more acceptable shift towards the colour standard in view of the conversion rate of 90% for the PDZ used.

In conclusion, the results for Examples 1 and 2 imply that unmilled plasma dissociated zircon with a mean particle size of 103 μm produces a pigment very close to the standard particularly with regard to the b- and the L-values.

EXAMPLE 3

Effect of PDZ Conversion Rate on Pigment Colour

In this example, the influence of the PDZ conversion rate on the colour of the V-blue and the Pr-yellow pigments was determined. Samples of PDZ, respectively produced at conversion rates of 95.7, 90.0, 82.4 and 74.7%, were used to produce a series of Pr-yellow (Table 3) and V-blue (Table 4) pigments each. The same preparation and production conditions, and the same quantities of raw materials, as were used in Examples 1 and 2, were used.

In Table 3 the colour measurement results for the Pr-yellow pigments show that the b-value improves from 65.6 for PDZ with a conversion rate of 74.7%, to 82.3 for PDZ with a conversion rate of 95.7%. This clearly indicates that the higher the PDZ conversion rate, the more yellow the colour of the pigment turns out. What is more, b=82.3 for PDZ with a conversion rate of 95.7% even surpasses that of the Pr-yellow standard, a fact supported by its colour depth (L=77.3), indicating that this yellow pigment features a deeper hue. In this context, the deviation (DE*=4.9) from the standard must be interpreted as a beneficial deviation.

In Table 4 the influence of the PDZ conversion rate on the colour of the V-blue pigments is shown. Here b increases from −7.8 for PDZ with a conversion rate of 74.7% to −17.9 for PDZ with a conversion rate of 95.7%, giving an improvement of 10.1. Again, b=−17.9 for the PDZ with highest conversion rate equals or betters that of the V-blue standard.

Thus, the PDZ conversion rate was found to be the most important parameter influencing the colour of the yellow and blue pigments. Higher conversion rates consistently result in deeper blue and yellow pigments, respectively, that compare very favourably with the pigment standards. Apparently a higher PDZ conversion rate implies that less unconverted zircon is present, which reduces the susceptibility for colouring of the zircon.

TABLE 3

Example 3
COLOUR EFFECT OF THE PDZ CONVERSION RATE ON Pr-YELLOW

| Samples | Conversion rate of PDZ (%) | L L = 100: white L = 0: black | a a+: red a−: green | b b+: yellow b−: blue | DE* |
|---|---|---|---|---|---|
| Standard | — | 78.7 | 1.3 | 79.1 | — |
| Invention | 95.7 | 77.3 | 4.8 | 82.3 | 4.9 |
| Unmilled | 90.0 | 78.8 | 1.6 | 71.6 | 7.6 |
| PDZ | 82.4 | 79.6 | 0.6 | 68.3 | 10.8 |
|  | 74.7 | 79.3 | 0.03 | 65.6 | 13.5 |

TABLE 4

Example 3
COLOUR EFFECT OF THE PDZ CONVERSION RATE ON V-BLUE

| Samples | Conversion rate of PDZ (%) | L L = 100: white L = 0: black | a a+: red a−: green | b b+: yellow b−: blue | DE* |
|---|---|---|---|---|---|
| Standard | — | 49.0 | −21.9 | −17.3 | — |
| Invention | 95.7 | 50.7 | −20.3 | −17.9 | 2.4 |
| Unmilled | 90.0 | 53.7 | −19.9 | −13.4 | 6.4 |
| PDZ | 82.4 | 55.0 | −18.9 | −11.5 | 8.9 |
|  | 74.7 | 57.3 | −18.2 | −7.8 | 13.2 |

The Applicant has thus surprisingly found that it is possible to produce inorganic zircon-based pigments directly from PDZ, without first treating the PDZ by milling it and chemically treating it. These time-consuming and costly steps can thus be eliminated.

The use of inorganic zircon-based pigments (also known as stains) particularly, but not solely, in colouring ceramic articles, eg ceramic tiles, is well established.

The present invention thus provides a process whereby such pigments can be produced more readily and more cost-effectively than has hitherto been the case.

The invention claimed is:

1. A process for producing an inorganic doped-zircon pigment comprising:
   obtaining a raw plasma-dissociated zircon;
   calcining a base mixture of said raw plasma-dissociated zircon, a chromophore and at least one mineralizer to produce a raw pigment; and
   refining the raw pigment to obtain an inorganic doped-zircon pigment;
   wherein said raw plasma-dissociated zircon is not subject to milling between the plasma dissociation of the zircon and mixing thereof with the chromophore and the at least one mineralizer.

2. A process according to claim 1, which includes forming the base mixture by mixing the raw plasma-dissociated zircon or PDZ, the chromophore and the mineralizer.

3. A process according to claim 2, wherein the raw PDZ, chromophore and mineralizer are mixed sufficiently so that the base mixture is a homogeneous blend.

4. A process according to claim 1, wherein the chromophore or colour-determining agent is selected from the group comprising sodium molibdate; praseodymium oxide, carbonate or oxalate; ammonium metavanadate; vanadium pentoxide; iron oxide and iron sulphate.

5. A process according to claim 1, wherein the mineralizer is an alkali metal fluoride, $(NH_4)_2SO_4$ or $Na_2SO_4$, or a combination of two or more of these.

6. A process according to claim 1, wherein the calcination of the base mixture is effected in an air furnace.

7. A process according to claim 1, wherein the calcination temperature is from 800° C. to 1300° C.

8. A process according to claim 1, wherein the refining of the raw pigment includes washing, comminuting and drying it, to obtain the refined inorganic doped-zircon pigment.

* * * * *